US012141651B2

(12) United States Patent
Handshaw et al.

(10) Patent No.: US 12,141,651 B2
(45) Date of Patent: Nov. 12, 2024

(54) DIGITAL BARCODE READER

(71) Applicant: ZEBRA TECHNOLOGIES CORPORATION, Lincolnshire, IL (US)

(72) Inventors: Darran Michael Handshaw, Sound Beach, NY (US); Warren C. Zuelch, Wantagh, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 257 days.

(21) Appl. No.: 16/430,167

(22) Filed: Jun. 3, 2019

(65) Prior Publication Data

US 2020/0380218 A1 Dec. 3, 2020

(51) Int. Cl.
*G06K 7/10* (2006.01)

(52) U.S. Cl.
CPC .................... *G06K 7/109* (2013.01)

(58) Field of Classification Search
CPC ............... G06K 7/10881; G06K 7/109; G06K 7/10623; G06K 7/10821; G06K 7/10861; G06K 7/089; G06K 7/10831; G06K 2007/10524; G06K 7/10386; G06K 7/10376
USPC .................................................... 235/462.43
See application file for complete search history.

(56) References Cited

U.S. PATENT DOCUMENTS

| | | | | | |
|---|---|---|---|---|---|
| 4,589,713 A | * | 5/1986 | Pfuhl | ...................... | H01R 35/02 439/162 |
| 4,645,153 A | * | 2/1987 | Granzow | ............. | F16M 11/126 248/181.2 |
| 4,963,721 A | * | 10/1990 | Kohno | ..................... | A47F 9/046 235/462.43 |
| 5,108,062 A | * | 4/1992 | Detwiler | ................ | F16M 11/10 248/185.1 |
| 5,198,650 A | * | 3/1993 | Wike, Jr. | ................ | G06K 7/109 235/462.45 |
| 5,216,232 A | * | 6/1993 | Knowles | ................... | G06K 7/10 235/462.4 |
| 5,340,973 A | * | 8/1994 | Knowles | .............. | G02B 26/106 235/462.22 |

(Continued)

FOREIGN PATENT DOCUMENTS

| | | |
|---|---|---|
| CN | 206003107 | 3/2017 |
| DE | 19781569 B4 | 3/1999 |

(Continued)

OTHER PUBLICATIONS

Novelty Search Report for Belgian Patent Application No. 2020/5386 mailed on Apr. 22, 2021.

(Continued)

*Primary Examiner* — Daniel I Walsh
(74) *Attorney, Agent, or Firm* — Yuri Astvatsaturov

(57) ABSTRACT

A barcode reader assembly for capturing at least one object appearing in a field of view (FOV) is provided that includes a reader and a stand. The reader includes a reader enclosure having a top portion and a bottom portion and a reader base including a curved base surface. The bottom portion of the reader enclosure is mechanically coupled to the reader base. The stand includes a platform and a wall extending therefrom in a generally upward direction. The reader base is mechanically coupled to the stand such that the reader is rotatable relative to the stand.

19 Claims, 7 Drawing Sheets

(56) References Cited

U.S. PATENT DOCUMENTS

| | | | | |
|---|---|---|---|---|
| 5,477,044 | A * | 12/1995 | Aragon | G06K 7/10881 235/462.45 |
| 5,539,194 | A * | 7/1996 | Miller | B60R 11/02 235/454 |
| 5,612,530 | A * | 3/1997 | Sanders | G06K 7/10881 235/462.48 |
| 5,750,975 | A * | 5/1998 | Myerson | G06K 7/10881 235/472.01 |
| 5,861,615 | A * | 1/1999 | Bridgelall | G06K 7/10811 235/472.01 |
| 5,978,211 | A * | 11/1999 | Hong | F16M 11/10 381/388 |
| 5,992,747 | A * | 11/1999 | Katoh | G06K 7/109 235/462.43 |
| 6,034,379 | A * | 3/2000 | Bunte | G06K 7/10722 235/472.01 |
| 6,065,676 | A | 3/2000 | Ring et al. | |
| 6,053,413 | A * | 4/2000 | Swift | G06K 7/109 235/462.43 |
| 6,111,544 | A * | 8/2000 | Dakeya | H01Q 1/243 343/700 MS |
| 6,216,953 | B1 * | 4/2001 | Kumagai | G06K 7/1096 235/462.43 |
| 6,257,492 | B1 * | 7/2001 | Bressler | G06K 7/10851 235/462.46 |
| 6,405,926 | B1 * | 6/2002 | Yomogida | G06K 7/10881 235/462.46 |
| 6,561,429 | B2 * | 5/2003 | Bryant | G06K 7/10861 235/487 |
| 6,575,368 | B1 * | 6/2003 | Tamburrini | G06K 7/1096 235/462.25 |
| 6,575,370 | B1 * | 6/2003 | Dvorkis | G06K 7/109 235/462.43 |
| 6,603,656 | B2 * | 8/2003 | Cho | H05K 5/0234 16/346 |
| 6,604,684 | B1 * | 8/2003 | Schmidt | G06K 7/10584 235/462.32 |
| 6,719,201 | B2 * | 4/2004 | Tamburrini | G06K 7/10584 235/462.07 |
| D493,802 | S * | 8/2004 | Berentzen | D14/453 |
| 7,474,482 | B2 * | 1/2009 | Manine | G06K 7/10881 359/704 |
| 7,661,588 | B2 * | 2/2010 | Porvaznik | G07F 7/1008 235/487 |
| 8,223,490 | B2 * | 7/2012 | Dong | E05C 3/34 429/96 |
| 8,342,409 | B2 * | 1/2013 | Handshaw | G06K 7/10792 235/462.31 |
| 10,025,966 | B1 * | 7/2018 | Volta | H02J 7/0044 |
| 10,397,966 | B1 * | 8/2019 | DiGiovanna | H04W 76/10 |
| 10,453,047 | B2 * | 10/2019 | Hicks | G06Q 20/327 |
| 10,489,623 | B1 * | 11/2019 | Handshaw | G06K 7/10831 |
| 10,789,437 | B1 * | 9/2020 | Zhang | G06K 7/109 |
| 10,817,690 | B2 * | 10/2020 | Handshaw | G06K 7/1098 |
| 2001/0017320 | A1 * | 8/2001 | Knowles | G06K 7/10 235/462.37 |
| 2001/0032884 | A1 * | 10/2001 | Ring | G06K 7/10693 235/454 |
| 2002/0030107 | A1 * | 3/2002 | Byun | G06K 7/10861 235/462.45 |
| 2002/0066838 | A1 * | 6/2002 | Katoh | G06K 7/10881 248/133 |
| 2002/0074411 | A1 * | 6/2002 | Chang | G06K 7/10653 235/462.43 |
| 2002/0195497 | A1 * | 12/2002 | Kumagai | G06K 7/10851 235/472.01 |
| 2003/0201329 | A1 * | 10/2003 | Kumagai | G06K 7/10851 235/462.32 |
| 2004/0149829 | A1 * | 8/2004 | Boucher | G06K 7/10861 235/462.43 |
| 2005/0224583 | A1 * | 10/2005 | Tamburrini | G06K 7/10693 235/472.01 |
| 2005/0224853 | A1 * | 10/2005 | Ohkawa | H01L 27/14609 257/296 |
| 2006/0133965 | A1 * | 6/2006 | Tajima | G01N 35/1009 422/63 |
| 2006/0145927 | A1 * | 7/2006 | Choi | H01Q 9/045 343/700 MS |
| 2007/0017997 | A1 * | 1/2007 | Talley | G06K 7/10881 235/462.43 |
| 2008/0245982 | A1 * | 10/2008 | Vonmetz | G06K 7/10613 250/566 |
| 2008/0302873 | A1 * | 12/2008 | Kotlarsky | G06F 9/44526 235/462.15 |
| 2009/0034169 | A1 * | 2/2009 | Richardson | G06F 1/1632 361/679.01 |
| 2010/0258631 | A1 * | 10/2010 | Rueblinger | H01H 13/02 200/522 |
| 2011/0073658 | A1 * | 3/2011 | Vassura | G06K 7/10881 235/472.01 |
| 2011/0132984 | A1 * | 6/2011 | Fletcher | G07G 1/0018 248/176.3 |
| 2012/0182392 | A1 * | 7/2012 | Kearns | B25J 19/023 348/46 |
| 2012/0193422 | A1 * | 8/2012 | Franz | G06K 7/0004 235/462.13 |
| 2012/0199654 | A1 * | 8/2012 | Zhu | G06K 7/10732 235/455 |
| 2012/0203647 | A1 * | 8/2012 | Smith | G07G 1/0036 705/23 |
| 2014/0197240 | A1 * | 7/2014 | Mistkawi | G06K 7/10821 235/470 |
| 2014/0209675 | A1 * | 7/2014 | Collins, Jr. | G07G 1/12 235/383 |
| 2016/0236493 | A1 * | 8/2016 | Lyman | H01R 33/765 |
| 2016/0357999 | A1 * | 12/2016 | Hsieh | F16M 11/12 |
| 2017/0004336 | A1 * | 1/2017 | Lim | G06K 7/10138 |
| 2017/0346522 | A1 * | 11/2017 | Yan | H04B 1/3877 |
| 2018/0032104 | A1 * | 2/2018 | Schatz | G06F 1/1683 |
| 2018/0106820 | A1 * | 4/2018 | Okabe | G01N 35/02 |
| 2018/0285613 | A1 * | 10/2018 | Volta | G06K 19/06009 |
| 2018/0293412 | A1 * | 10/2018 | Volta | H02J 7/0044 |
| 2019/0065797 | A1 * | 2/2019 | Cheng | G06K 7/10623 |
| 2019/0130141 | A1 * | 5/2019 | Wang | G06K 7/10861 |
| 2020/0058008 | A1 * | 2/2020 | Hicks | G06K 7/0004 |
| 2020/0106279 | A1 * | 4/2020 | Di Bari | H02J 50/10 |
| 2020/0160013 | A1 * | 5/2020 | Klicpera | H02J 50/90 |
| 2020/0184535 | A1 * | 6/2020 | Barkan | G06F 16/252 |
| 2020/0226330 | A1 * | 7/2020 | Handshaw | G06K 7/04 |
| 2020/0355676 | A1 * | 11/2020 | Xu | B03C 1/01 |
| 2020/0380218 | A1 * | 12/2020 | Handshaw | G06K 7/10722 |
| 2020/0380219 | A1 * | 12/2020 | Zhao | G06K 7/10722 |
| 2021/0031359 | A1 * | 2/2021 | Chen | H02B 3/00 |
| 2021/0042479 | A1 * | 2/2021 | Handshaw | F16M 11/10 |
| 2021/0064830 | A1 * | 3/2021 | Handshaw | G06K 7/1443 |
| 2023/0316016 | A1 * | 10/2023 | Handshaw | G06K 7/10881 235/462.41 |
| 2023/0316020 | A1 * | 10/2023 | Handshaw | G06K 7/10881 235/472.01 |

FOREIGN PATENT DOCUMENTS

| | | |
|---|---|---|
| EP | 0520632 A1 | 12/1992 |
| GB | 2412470 A | 9/2005 |

OTHER PUBLICATIONS

Office Action for German Application No. 102020111623.3 mailed on Dec. 23, 2021.

* cited by examiner

DIGITAL BARCODE READER

BACKGROUND OF THE INVENTION

Barcode and other scanning devices generally capture images within a given field of view (FOV). In some instances, barcode readers are known to be used in multi-mode environments where the same reader can be used in a handheld mode in addition to a presentation mode where a product is presented to the reader and the reader activates an imaging assembly. As such, there are various situations where the reader may need to be held by hand and moved around, or it may be preferable to have the reader reside on a stable surface such as a table or counter top.

Accordingly, there is a need for improved accessories having improved functionalities.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
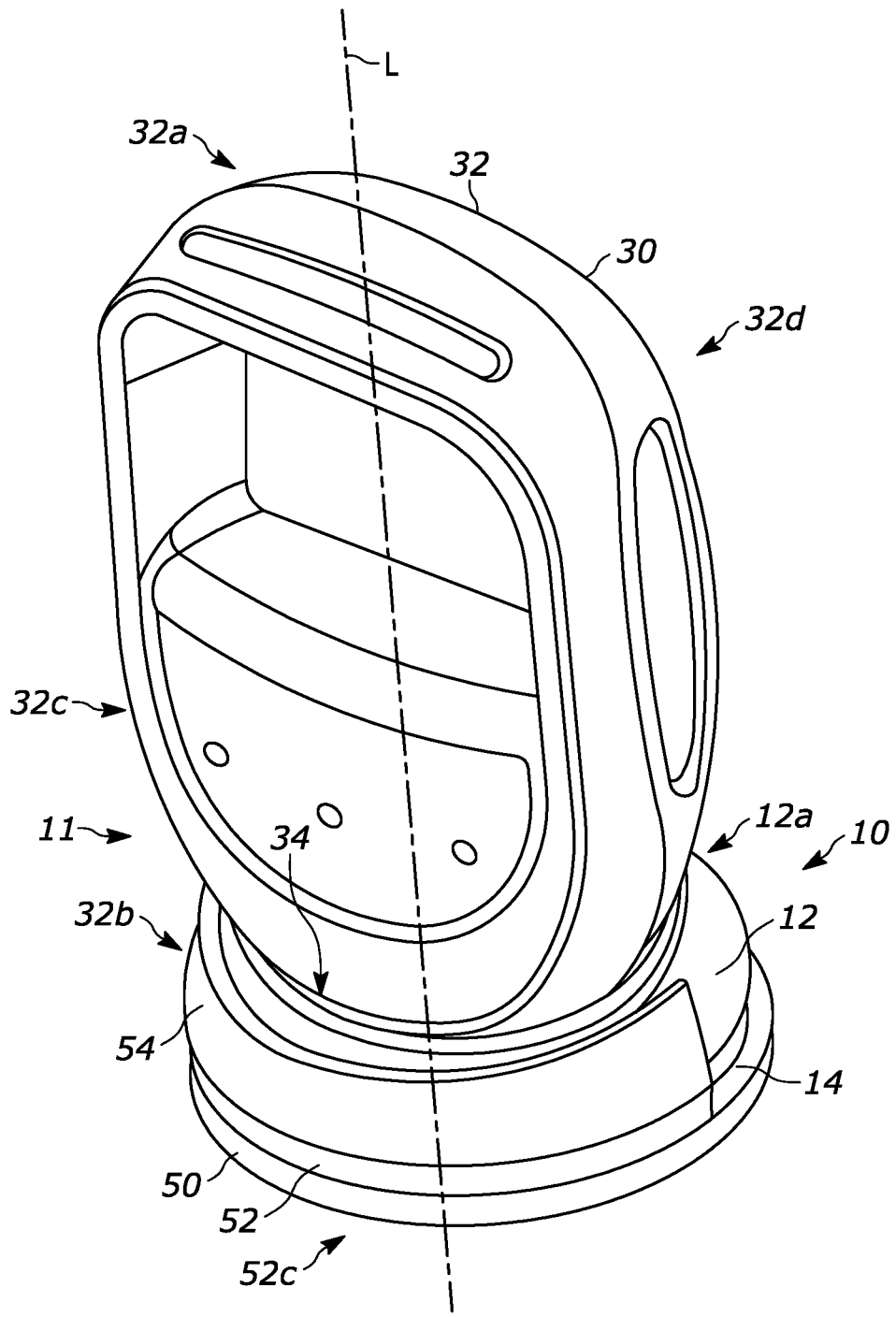
FIG. 1 is a front perspective view of a portable, industrial digital barcode reader assembly having a reader and a stand in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an embodiment, the present application provides a barcode reader assembly for capturing at least one object appearing in a field of view (FOV) is provided that includes a reader and a stand. The reader includes a reader enclosure having a top portion and a bottom portion and a reader base including a curved base surface. The bottom portion of the reader enclosure is mechanically coupled to the reader base. The stand includes a platform and a wall extending therefrom in a generally upward direction. The reader base is mechanically coupled to the stand such that the reader is rotatable relative to the stand.

In some aspects, the reader base is coupled to the platform via a mechanical linkage. The mechanical linkage may include a resilient finger component having a protrusion extending therefrom. The resilient finger may be carried by at least one of the reader base or the platform. This protrusion may be in the form of an angled sidewall that rotatably engages a linkage opening. In some examples, at least one of the angled sidewall or the linkage opening includes at least one detent to selectively limit relative rotation between the reader in the stand. In some of these examples, the mechanical linkage cooperates with the wall of the stand to restrict relative translational movement between the reader and the stand.

In some forms, the platform may additionally include a mounting mechanism to secure the stand to a display surface. This mounting mechanism may be in the form of a throughbore. The mechanical linkage may also include a disengaging member to decouple the reader from the stand. This disengaging member may be formed on the resilient finger component.

In some approaches, the wall may include an opening that is dimensioned to accommodate a connection cable coupled to the reader. In some examples, the wall includes an opening to receive a portion of the reader base.

In another implementation, an accessory base for a barcode reader for capturing at least one image of an object appearing in a field of view (FOV) includes a platform including a perimeter, a wall extending generally upwardly from the platform about the perimeter thereof, and a mechanical linkage formed by the platform. The mechanical linkage includes a resilient finger component having a protrusion extending therefrom.

In yet another implementation, a barcode reader assembly for capturing at least one image of an object appearing in a field of view (FOV) includes a reader and a stand. The reader includes a reader enclosure having top and bottom portions. The reader base includes a curved base surface. The bottom portion of the reader enclosure is mechanically coupled to the reader base. The stand includes a platform and a curved wall extending therefrom in a generally upward direction, and is mechanically coupled to the reader base such that the reader is rotatable relative to the stand. When the reader is mechanically coupled to the stand, the curved base surface of the reader base and the curved wall of the stand are nested such that a clearance of less than approximately 5 mm is formed between the curved base surface and the curved reader enclosure surface.

Turning to the figures, reference numeral 10 generally identifies a barcode reader assembly that includes a reader 11 in the form of an ovoid-shaped housing having a base 12 and a reader enclosure 30 that is mechanically coupled to the base 12. As used herein the term barcode may refer to one-dimensional or two-dimensional barcodes and/or other symbologies used to encode information associated with items. The reader assembly 10 additionally includes a stand 50 to which the base 12 selectively couples.

Figure 6:
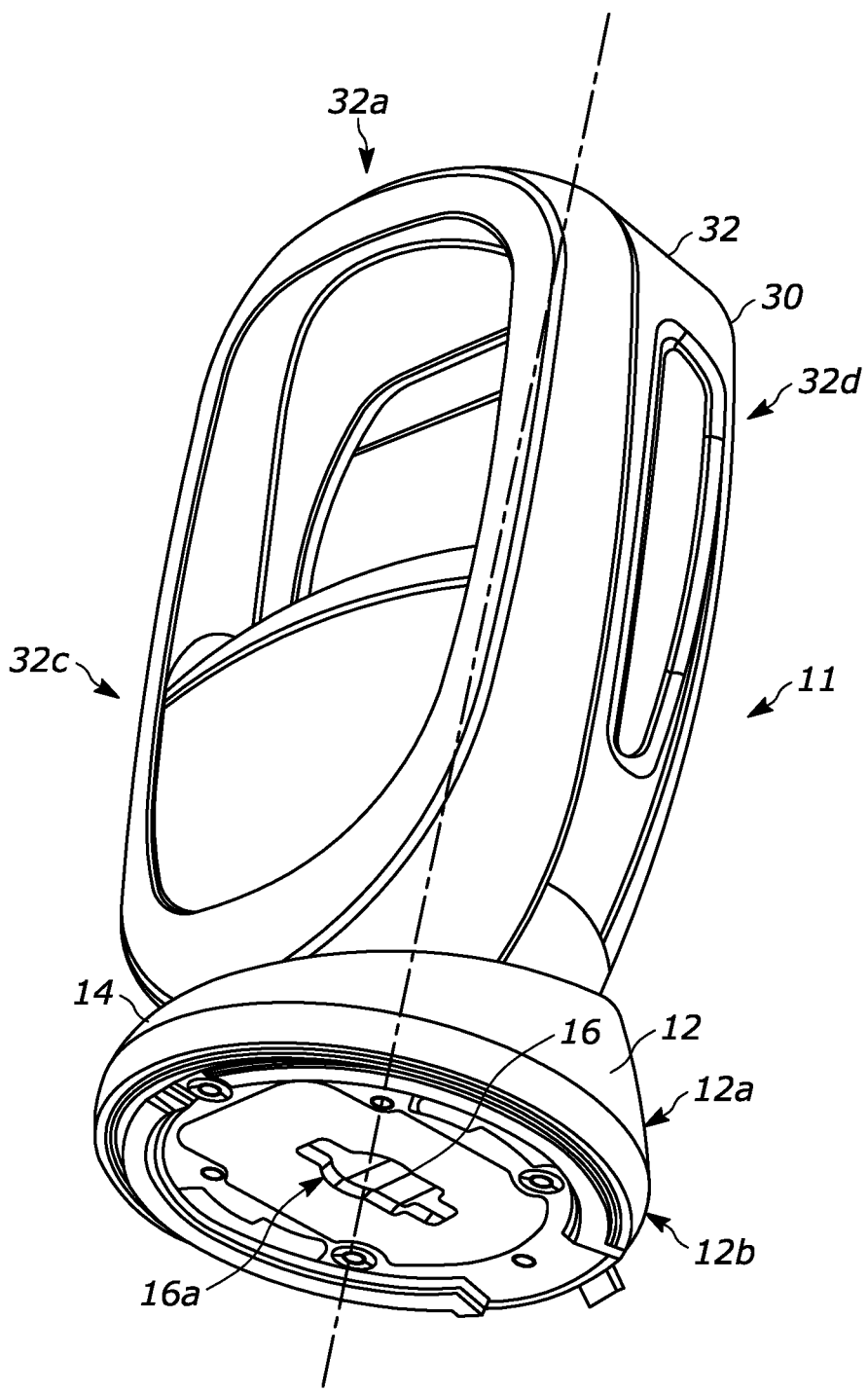
FIG. 6 is a lower perspective view of the reader of FIGS. 1-2B in isolation in accordance with this disclosure.

The base 12 includes an upper portion 12a and a lower portion 12b. The upper portion 12a of the base 12 includes a curved base surface 14 extending about a perimeter thereof. As illustrated in FIG. 6, the lower portion 12b of the base 12 includes a linkage opening 16 disposed at or near a central point of the base 12. As will be discussed in further detail below, this linkage opening 16 cooperates with a rotational axis of the stand 50 that the barcode reader 11 rotates about. The base 12 may be constructed from any number of suitable materials such as, for example, polymers and/or metallic materials. Other examples are possible.

The reader enclosure 30 is mechanically coupled to the base 12 (for example, by way of a mechanical linkage). The reader enclosure 30 is defined by an enclosure body 32 that has a top portion 32a, a bottom portion 32b opposite the top portion 32a, a front portion 32c, and a rear portion 32d opposite the front portion 32c. The front and rear portions 32c, 32d of the enclosure body 32 may be in the form of front and rear housings or clamshell members that operably secure to each other using any number of suitable approaches (e.g., fasteners, frictional and/or slotted engagement members, etc.).

Figure 2A:
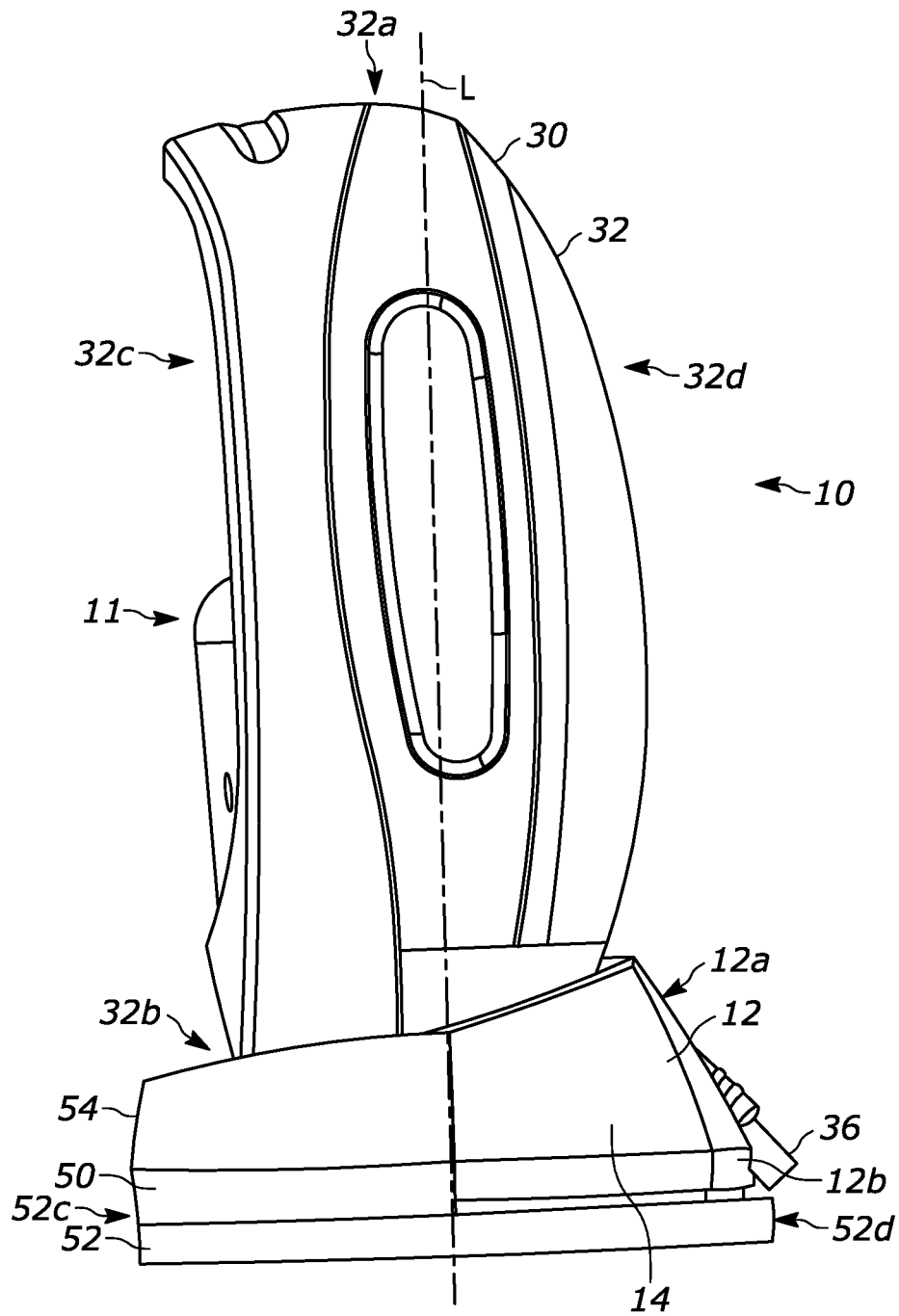
FIG. 2A is a side elevation view of the industrial digital barcode reader assembly of FIG. 1 in accordance with this disclosure.
Figure 2B:
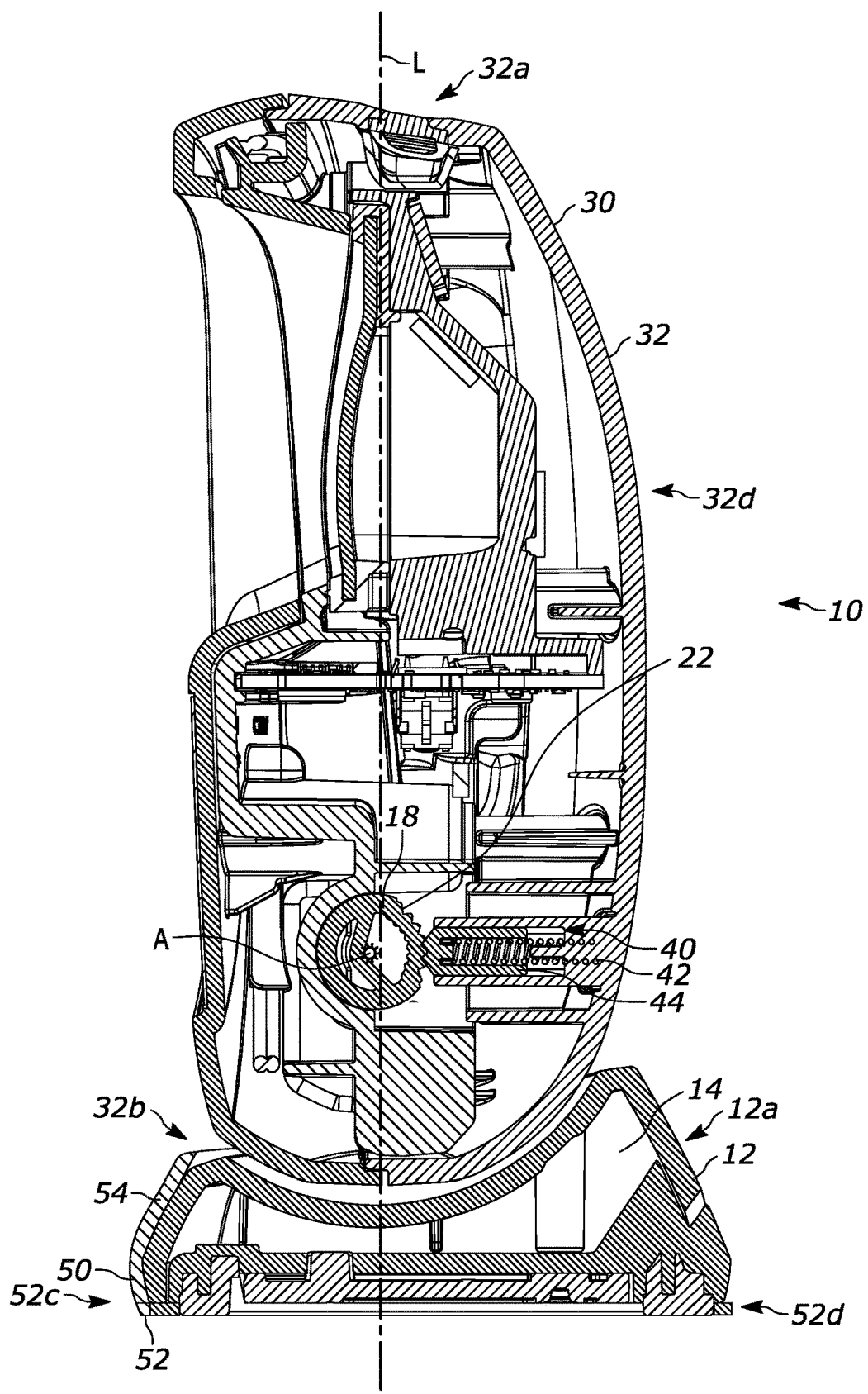
FIG. 2B is a side elevation cross sectional view of the industrial digital barcode reader assembly of FIGS. 1 and 2A in accordance with this disclosure.
Figure 3:
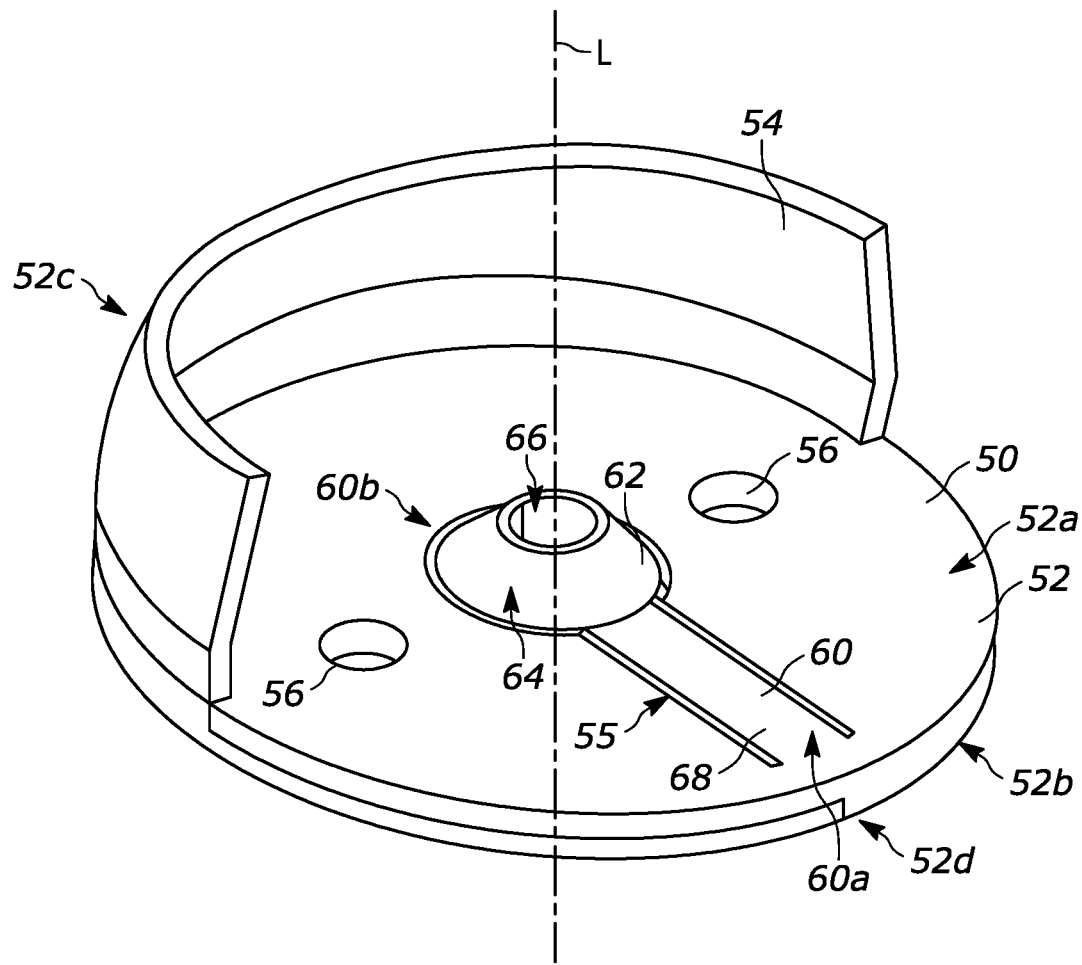
FIG. 3 is an upper rear perspective view of the stand of FIGS. 1-2B in isolation in accordance with this disclosure.

In the illustrated example, the bottom portion 32b of the enclosure body 32 is positioned proximate to the base 12, and defines a curved reader enclosure surface 34. In the illustrated example, the curved reader enclosure surface 34 is generally spherical, and nests within the upper portion 12a of the base 12. The enclosure body 32 further defines a rear cutout to accommodate an external data and/or power cable 36. Generally, the reader enclosure 30 is rotatable relative to the base 12 about an axis "A" via a mechanical linkage carried by the reader enclosure 30 or the base 12. Specifically, U.S. Provisional application Ser. No. 16/245,969, filed on Jan. 11, 2019, describes industrial digital barcode readers having specific mechanisms providing for relative movement (e.g., rotation) of components. The entire contents of this application are incorporated by reference herein. Specifically, as illustrated in FIG. 2B, the reader enclosure 30 rotates about the axis A, which is illustrated as being orthogonal to the cross-sectional view. The mechanical linkage may include a ratchet protrusion 18 that defines any number of ratchets or detents 22 to allow for selective positioning of the reader enclosure 30 relative to the base 12. A portion of the enclosure body (e.g., the rear portion 32d) additionally defines a pawl bore 40 to accommodate a resilient member (e.g., a spring) 42 and a pawl member 44. The resilient member 42 urges the pawl member 44 into engagement with the ratchet protrusion 18, whereupon the pawl member 44 may selectively engage with and/or be retained within a desired detent 22.

The resilient member 44 generates a force that gently resists urging or rotation by a user on the enclosure body 32 until the urging force is greater than the engaging force between the detent 22 and the pawl member 44. At this point, relative rotation between the pawl member 44 and the ratchet protrusion 18 causes the pawl member 44 to move into an adjacent detent 22, and may be retained therein until an urging force exerted by the user is again greater than the engaging force between the detent 22 and the pawl member 44. As a result, the enclosure body 32 may be selectively retained at a desired angle or configuration relative to the base body 12.

In the illustrated example, the stand 50 includes a platform 52 and a wall 54 extending from the platform in a generally upward direction. The platform 52 has a generally circular footprint that corresponds to the shape of the base 12, and includes an upper side 52a, a lower side 52b, a front side 52c, and a rear side 52d. The wall 54 extends upwardly from the upper side 52a of the platform 52 and is positioned at the front side 52c thereof. The wall 54 has a generally curved shape that corresponds to the shape of the platform 52, and terminates at a point between the front and rear sides 52c, 52d of the platform 52. In the illustrated example, the wall terminates at approximately a midpoint between the front and rear sides 52c, 52d of the platform 52, and as such, the wall 54 has a generally semicircular (e.g., half-circular) shape when viewed from a top plan view. Other examples of configurations are possible.

Figure 4:
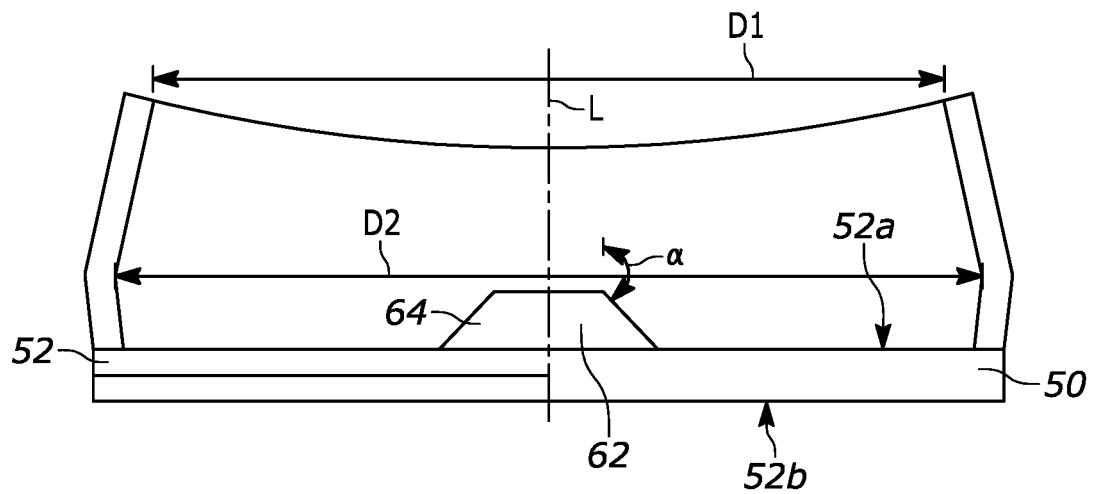
FIG. 4 is a rear elevation view of the stand of FIGS. 1-3 in isolation in accordance with this disclosure.
Figure 5:
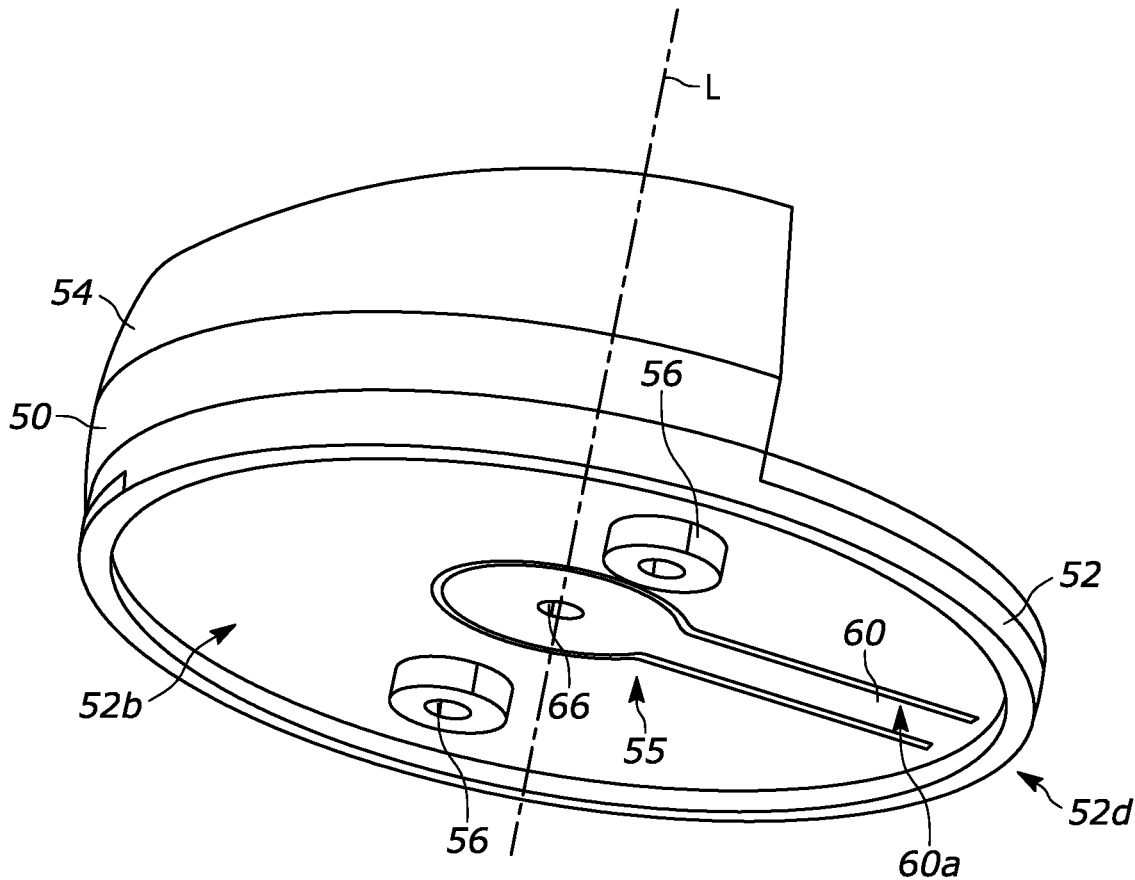
FIG. 5 is a lower perspective view of the stand of FIGS. 1-4 in isolation in accordance with this disclosure.

The wall 54 extends upwardly to a height that is approximately equal to the height of the base 12, so as to limit potential interference with the reader enclosure 30 when the reader 11 is coupled to the stand 50. Further, with particular reference to FIG. 4, the wall 54 is angled such that it extends inwardly, that is, a cross-sectional dimension D1 at the top of the wall 54 is less than a cross-sectional dimension D2 at the bottom of the wall 54 and below the cross-sectional dimension D1. The stand 50 may be constructed from any number of suitable materials such as, for example, polymers and/or metallic materials. Other examples are possible.

In a preferred embodiment, a top-down cross-section of the base 12 about the wall 54 has a radius extending from axis L to the front portion of the base 12 (i.e., to the internal edge of the wall 54) that is equidistant for the entire cross-section. In other embodiments, the radius extending from the axis L to the front portion of the base 12 may be greater than a radius from the axis L to the rear portion of the base 12.

The stand 50 may additionally include any number of mounting structures 56 used to secure the stand 50 to an object such as a table, a register, a desk, or any other component. In the illustrated example, the mounting structure 56 is in the form of a hole or throughbore that accommodates a fastener (e.g., a screw or bolt), but in other examples, other devices such as adhesives, hook-and-loop fasteners, and the like may be used.

The platform 52 of the stand 50 further carries a mechanical linkage in the form of a resilient finger 60. In the illustrated example, this resilient finger 60 is formed by a cutout 55 formed on the platform 52 that extends from the rear side 52d towards the front side 52c thereof. In the illustrated example, the cutout 55 includes an elongated portion and a generally circular portion, but other example shapes or arrangements of the cutout 55 are possible. A proximal end 60a of the resilient finger 60 is coupled to and/or formed integrally with the platform 52. The cutout 55 allows a distal end 60b of the resilient finger 60 to move (i.e. rotate) about the proximal end 60a thereof. In the illustrated example, the resilient finger 60 is generally coplanar to a plane formed by the upper side 52a of the platform 52, but in other examples, any relative angle may be formed between a plane formed by the resilient finger 60 and the plane formed by the upper side 52a of the platform 52.

A protrusion 62 is positioned at the distal end 60b of the resilient finger 60. This protrusion 62 is a generally conical or frustoconical member that includes an angled sidewall 64 extending away from the upper side 52a of the platform 52 (i.e., in the same upward direction as the wall 54). Other shapes or arrangements of the protrusion 62 are possible, such as spherical, pyramidal, etc. The protrusion 62 additionally can include a throughbore 66 extending therethrough.

Figure 7:
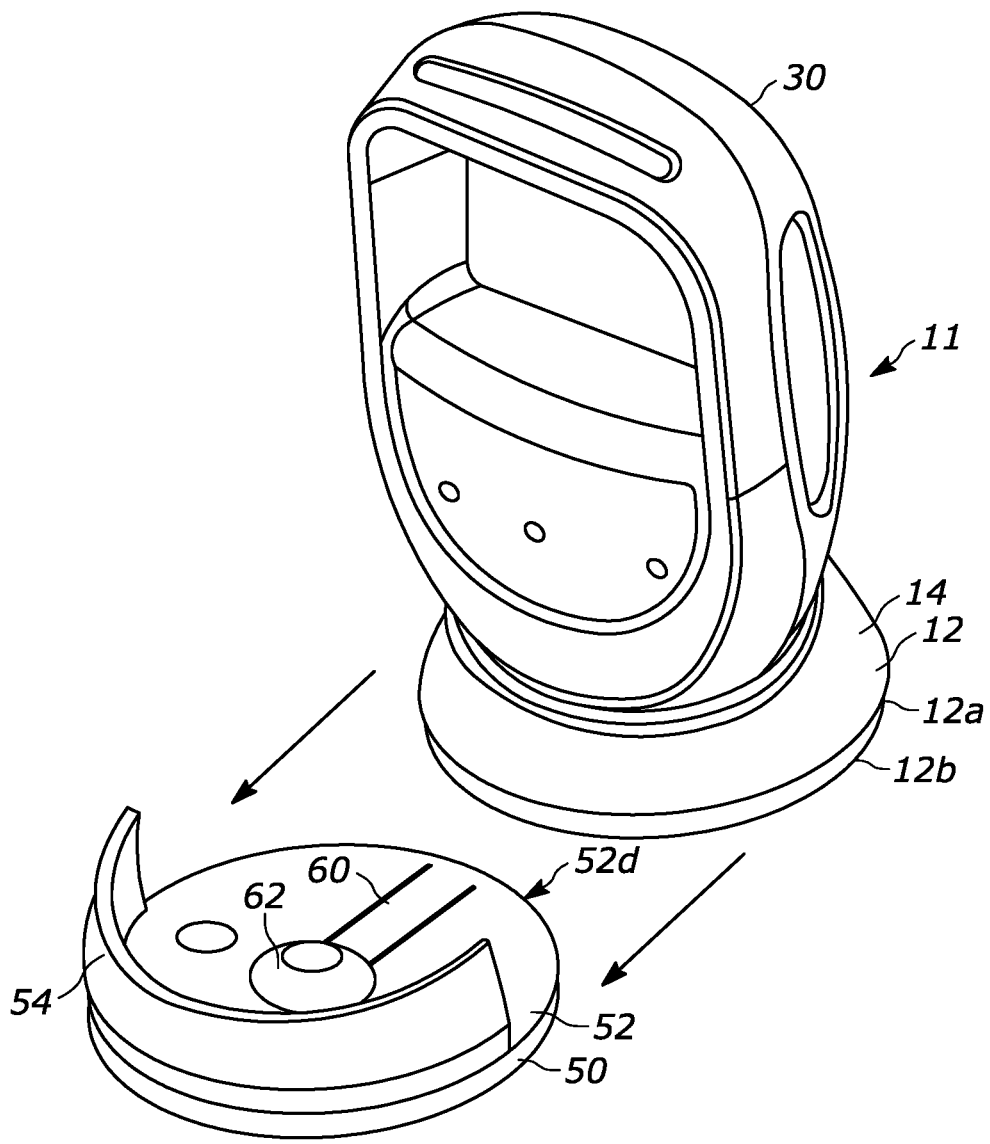
FIG. 7 is a perspective view of the digital barcode reader assembly of FIGS. 1-6 illustrating coupling of the reader to the stand in accordance with this disclosure.

Generally, the resilient finger 60 is configured to exert an upward urging force on the reader 11 when coupled to the stand 50 and to retain the reader 11 therein. As illustrated in FIG. 7, to secure the reader 11 to the stand 50, the base 12 is moved from the rear side 52d of the platform 52 towards the front side 52c of the platform 52. This relative movement causes the lower portion 12b of the base 12 to contact the protrusion 62, thereby urging the resilient finger 60 downwards. Continued urging of the reader 11 into the stand 50 causes the protrusion 62 to be aligned with the linkage opening 16 of the base 12. Because the lower portion 12b of the base 12 is no longer in engagement with the protrusion 62, the distal end 60b of the resilient finger 60 moves upward so that the protrusion 62 is at least partially inserted into the linkage opening 16. In this position, the angled sidewall 64 may abut a rim or contact surface 16a of the linkage opening 16, and thus the resilient finger 60 may exert an upward urging force on the base 12.

Because the wall 54 is concave and the curved base surface 14 is convex, when the reader 11 is coupled to the stand 50, the curved base surface 14 is nested within the wall 54. It is understood that nesting of the reader 11 within the stand 50 allows for unobstructed or limited rotation about an axis "L" extending from the protrusion 62 of both components relative to each other. In some examples, the curved base surface 14 and the wall 54 may be positioned such that up to and including an approximately 5 mm gap or clearance is formed such that the curved base surface 14 does not frictionally engage the wall 54. However, in other examples, the curved base surface 14 may contact the wall 54 in a manner that results in frictional engagement of the two surfaces. In any event, by coupling the reader 11 to the stand 50, the wall 54 helps to limit relative non-rotational movement of the reader 11 relative to the stand 50.

The resilient member 60 generates a force that gently resists urging or removing of the reader 11 by a user until the urging force is greater than the engaging force between the angled sidewall 64 and the contact surface 16a. The force needed to remove the reader 11 from the stand 50 may be adjusted by varying the angle $\alpha$ (FIG. 4) of the angled sidewall 64 relative to the axis L. For example, when the angle $\alpha$ is relatively small (e.g., between approximately 91° and 135°, resulting in a relatively gentle slope), the engaging force between the angled sidewall 64 and the contact surface 16a is low and thus the reader 11 may be removed from the stand 50 with minimal effort. Conversely, if the angle $\alpha$ is relatively large (e.g., between approximately 135° and approximately 175°, resulting in a relatively steep slope), the engaging force between the angled sidewall 64 and the contact surface 16a is high, and thus a greater force is required to remove the reader 11 from the stand 50.

To operate and/or reposition the reader 11, a user may grasp a portion of the reader enclosure 30 and urge a portion (e.g., the top portion 32a) of the enclosure body 32 in a desired direction to cause the reader enclosure 30 to tilt upwards or downwards relative to the base 12 and the stand 50. Further, the user may rotate the reader 11 relative to the stand 50 about the axis L. So configured, a user may position a barcode or other object within the FOV of the reader 11. The user may engage a trigger or other mechanism that causes the reader 11 to capture an image of the barcode or other object. Alternatively, in some examples, the reader 11 may be activated in a presentation mode to capture an image of the barcode or other object.

In any of these configurations of the angled sidewall 64, an additional release mechanism 68 may be provided to assist in removal of the reader 11 from the stand 50. For example, the release mechanism 68 may be in the form of a contact region disposed on the resilient finger 60 that a user may depress to cause the protrusion 62 to lower and decouple from the linkage opening 16. In these examples, the user may use a tool (not illustrated) to depress the resilient finger 60. In other instances, the platform 52 may extend in a rearward direction beyond the footprint of the base 12 such that when the reader 11 is mounted within the stand 50, the rear portion of the platform is still accessible to the user such that the user may depress the contact region 68 with, for example a finger.

In other examples, the release mechanism 68 may be in the form of a rod inserted into the throughbore 66 of the resilient finger 60 that extends through and below a lower surface of the stand, desk, table, and/or display that the assembly 10 is mounted to. In these examples, a user may grasp the rod below the lower surface of the stand and pull downwards to lower the resilient finger 60, thus disengaging the protrusion 62 from the linkage opening 16. Other examples are possible.

In some aspects, the barcode reader assembly 10 may include any number of optional arrangements, configurations, and/or components. For example, in some approaches, the protrusion 62 or the contact surface 16a of the linkage opening 16 may carry any number of detents that engage a ratchet mechanism or protrusion carried by the contact surface 16a or the protrusion 62 that selectively engages the detents, thus positioning and retaining the reader 10. Relative rotation between these detents and the corresponding protrusion will cause the protrusion to move into an adjacent detent, and may be retained therein until an urging force exerted by the user is greater than the engaging force between the detent and the protrusion. As a result, the reader 11 may be selectively retained at a desired angle or configuration relative to the stand 50.

In some aspects, the linkage opening 16 may be in the form of a conical (or any other shape) cavity that corresponds to the shape of the protrusion 62. In such an arrangement, the angled sidewall 64 will frictionally engage the sidewall of the cavity, which can include depressions to limit relative motion between the stand 50 and the reader 11 to a desired number of intervals. Other examples are possible.

In some approaches, the reader 11 may be selectively rotationally locked relative to the stand 50. In these examples, the wall 54 may include a notched portion (not illustrated) extending along its length at any desired location (e.g., at a midpoint of the wall 54 at or near the front side 52c of the platform 52. This notched portion may be sided or dimensioned to allow the data and/or power cable 36 to be inserted into. As an example, a user may tilt the reader enclosure 30 downwards so that the rear portion 32d of the enclosure body 32, and thus the data and/or power cable 36, is disposed above the top surface of the wall 54. The user may then rotate the reader 11 about the axis L relative to the stand 50 until the data and/or power cable 36 is positioned above the notched portion. The user may then tilt the reader enclosure 30 back to a level position, and thus the data and/or power cable 36 will be inserted into the notched portion, thus restricting relative rotation between the reader 11 and the stand 50. The user may reverse these steps to again allow for relative rotation between these components. Other examples of locking mechanisms are possible.

In some examples, the arrangement of the components of the barcode reader assembly 10 may be reversed. For example, the resilient finger 60 may be carried by the base 12 and may include a protrusion that extends downwardly into a linkage opening and/or cavity formed by the stand 50.

So configured, the barcode reader assembly 10 may use a single accessory stand that is capable of providing selective rotation and locking of the reader 11. Because of the arrangements of the wall 54 and the resilient finger 60, the reader 11 is capable of rotation in either the locked or unlocked configurations. As a result, a robust rotational mechanism may be used while maintaining minimal gaps or clearances between components and surfaces that move relative to each other (i.e., the curved base surface 14 of the base 12 and the wall 54 of the stand 50. Accordingly, moving components are not exposed to elements that may impede proper tilting or rotation of the device, and the likelihood of a user's fingers becoming pinched are reduced.

In any or all of these implementations, the barcode reader assembly 10 may be alternately operable in at least one of a manual mode or a presentation or hands-free mode. The assembly 10 may be jointly lifted as a unit off the support surface, and held in an operator's hand, and used in a handheld or manual mode of operation in which a trigger mechanism is manually actuated and depressed to initiate reading of symbol/document, such as a barcode on a product, in a range of working distances relative to a window. In a presentation or hands-free mode of operation, the reader 10 is jointly mounted on the support surface in which symbol/document targets are presented in a range of working distances relative to the window for reading.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A barcode reader assembly for capturing at least one image of an object appearing in a field of view (FOV), the barcode reader assembly comprising:
   a barcode reader including:
      a barcode reader enclosure having a top portion, a front portion, and a bottom portion, and
      a barcode reader base including a curved base surface, the bottom portion of the barcode reader enclosure being mechanically coupled to the barcode reader base; and a stand including a platform and a wall extending from the platform in a generally upward direction and at least partially ahead of the front portion of the barcode reader enclosure, the barcode reader base being mechanically coupled to the stand such that the barcode reader base is rotatable within a rotation plane having a normal vector that is further normal to a plane formed by an upper side of the platform, wherein the barcode reader base is rotatable about the normal vector, wherein the barcode reader base is coupled to the platform via a mechanical linkage, wherein the mechanical linkage includes a resilient finger component having a protrusion extending therefrom, wherein the normal vector passes through a center of the protrusion, and wherein the mechanical linkage cooperates with the wall of the stand to restrict relative translational movement between the barcode reader and the stand.

2. The barcode reader assembly of claim 1, wherein the protrusion comprises an angled sidewall adapted to rotatably engage a linkage opening.

3. The barcode reader assembly of claim 2, wherein at least one of the angled sidewall or the linkage opening comprises at least one detent to selectively limit relative rotation between the barcode reader and the stand.

4. The barcode reader assembly of claim 1, wherein the resilient finger is carried by at least one of the barcode reader base or the platform.

5. The barcode reader assembly of claim 1, wherein the platform includes a mounting mechanism to secure the stand to a display surface.

6. The barcode reader assembly of claim 1, wherein the mechanical linkage further comprises a disengaging member to decouple the barcode reader from the stand.

7. The barcode reader assembly of claim 6, wherein the disengaging member is formed on the resilient finger component.

8. The barcode reader assembly of claim 1, wherein the wall includes an opening dimensioned to accommodate a connection cable coupled to the barcode reader.

9. The barcode reader assembly of claim 1, wherein the wall includes an opening to receive a portion of the barcode reader base.

10. An accessory stand for a barcode reader for capturing at least one image of an object appearing in a field of view (FOV), the accessory stand comprising:
a platform including a perimeter;
a wall extending generally upwardly from the platform, the wall being semicircular about an axis normal to a plane formed by an upper side of the platform; and
a mechanical linkage formed by the platform, the mechanical linkage including a resilient finger component having a protrusion extending therefrom, wherein the barcode reader is rotatable about a normal vector, wherein the normal vector is aligned with a center of the protrusion,
wherein the mechanical linkage is adapted to exert an urging force on a portion of the barcode reader to position the barcode reader against the wall of the accessory stand.

11. The accessory stand of claim 10, wherein the protrusion comprises an angled sidewall adapted to rotatably engage a linkage opening of the barcode reader.

12. The accessory stand of claim 11, wherein at least one of the angled sidewall or the linkage opening comprises at least one rotation limiter to selectively limit relative rotation between the barcode reader and a base.

13. The accessory stand of claim 10, wherein further comprising a mounting mechanism to secure the accessory stand to a display surface.

14. The accessory stand of claim 10, further comprising a disengaging member adapted to decouple the barcode reader from a base.

15. The accessory stand of claim 14, wherein the disengaging member is formed on the resilient finger component.

16. The accessory stand of claim 10, wherein the wall of a base includes an opening dimensioned to accommodate a connection cable coupled to the barcode reader.

17. A barcode reader assembly for capturing at least one image of an object appearing in a field of view (FOV), the barcode reader assembly comprising:
a barcode reader including:
a barcode reader enclosure having a top portion, a front portion, and a bottom portion, and
a barcode reader base including a curved base surface, the bottom portion of the barcode reader enclosure being mechanically coupled to the barcode reader base; and
a stand including a platform and a curved wall extending from the platform in a generally upward direction, the barcode reader base being mechanically coupled to the stand such that the barcode reader is rotatable relative to the stand, wherein the barcode reader is rotatable about normal vector to the stand;
wherein when the barcode reader is mechanically coupled to the stand, the curved base surface of the barcode reader base and the curved wall of the stand are nested such that a clearance of less than approximately 5 mm is formed between the curved base surface and the curved wall,
wherein the barcode reader base is coupled to the platform via a mechanical linkage, wherein the mechanical linkage includes a resilient finger, the resilient finger having a protrusion extending from an end of the resilient finger, wherein the normal vector is aligned with a center of the protrusion,
wherein the resilient finger is carried by at least one of the barcode reader base or the platform, and
wherein the protrusion comprises an angled sidewall adapted to rotatably engage a linkage opening.

18. The barcode reader assembly of claim 17, wherein the mechanical linkage cooperates with the wall of the stand to restrict relative translational movement between the barcode reader and the stand.

19. The barcode reader assembly of claim 17, wherein the curved base surface of the barcode reader base is convex and the curved wall of the stand is concave.

* * * * *